United States Patent
Michalakos et al.

(10) Patent No.: US 7,132,086 B2
(45) Date of Patent: **\*Nov. 7, 2006**

(54) ENVIRONMENTAL CONTROL SYSTEM INCLUDING VAPOR CYCLE SYSTEM AND ISOTHERMAL CATOX/PTF

(75) Inventors: Peter M. Michalakos, Chicago, IL (US); Norman Van Den Bussche, Arlington Heights, IL (US); Robert Tom, Redondo Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 690 days.

This patent is subject to a terminal disclaimer.

(21) Appl. No.: 09/907,798

(22) Filed: Jul. 18, 2001

(65) Prior Publication Data
US 2003/0017090 A1    Jan. 23, 2003

(51) Int. Cl.
*B01D 50/00* (2006.01)
*B01D 53/34* (2006.01)
*B01D 53/54* (2006.01)
*B01D 53/56* (2006.01)
*F01N 3/00* (2006.01)

(52) U.S. Cl. ............... 422/169; 422/168; 422/171; 422/180; 422/177

(58) Field of Classification Search ........ 422/168–173, 422/177, 180
See application file for complete search history.

(56) References Cited

U.S. PATENT DOCUMENTS

| | | | |
|---|---|---|---|
| 4,824,363 A | 4/1989 | Abthoff et al. | |
| 5,151,022 A | 9/1992 | Emerson et al. | |
| 5,294,410 A | 3/1994 | White | |
| 5,720,931 A * | 2/1998 | Rossin et al. | 423/236 |
| 5,727,385 A * | 3/1998 | Hepburn | 60/297 |
| 6,375,849 B1 * | 4/2002 | Crabtree et al. | 210/652 |
| 6,503,462 B1 * | 1/2003 | Michalakos et al. | 422/173 |
| 6,855,297 B1 * | 2/2005 | Van Den Bussche et al. | 422/177 |

FOREIGN PATENT DOCUMENTS

| | | | |
|---|---|---|---|
| CA | 2312609 | * | 12/2000 |
| WO | WO 97/27932 | | 8/1997 |
| WO | WO 99/25961 | | 5/1999 |
| WO | WO 01/12320 | * | 2/2001 |

OTHER PUBLICATIONS

Patent Abstracts of Japan, Air Conditioner for Vehicle, Inventor: Ikuo Kobayashi, Assignee: Matsushita Electric Co., Publication No. 56017716, Feb. 19, 1981, Application No. 54090572 filed Jul. 17, 1979.

* cited by examiner

*Primary Examiner*—Alexa D. Neckel
(74) *Attorney, Agent, or Firm*—Oral Caglar, Esq.

(57) ABSTRACT

An environmental control system includes a catalytic reactor and a post treatment filter for cleaning incoming air, and a vapor cycle system for conditioning the air.

14 Claims, 3 Drawing Sheets

ENVIRONMENTAL CONTROL SYSTEM INCLUDING VAPOR CYCLE SYSTEM AND ISOTHERMAL CATOX/PTF

BACKGROUND

The present invention relates to environmental control systems. More specifically, the present invention relates to an environmental control system including a vapor cycle system and an air filtration system for removing chemical and biological agents, toxic industrial chemicals (TICs) and toxic industrial materials (TIMs).

An air cycle system may be used to condition incoming air to a desired temperature, pressure, and humidity before the air is supplied to an enclosed environmental space. Aircraft cabins and gas turbine-powered tanks are typical of the enclosed environmental spaces that allow air cycle systems to be used.

In certain applications, it is highly desirable to remove nuclear, chemical and biological (NBC) agents from the air before the air reaches the enclosed environmental space. Protection against NBC agents may be provided via packed beds of impregnated activated carbon and high efficiency particulate air (HEPA) filters.

For closed environmental spaces where the air is not pressurized, vapor cycle systems (VCS) are often used to condition the air. Such environmental spaces may include helicopters, buildings, tents, diesel and gasoline-powered tanks, and shelters.

However, removing NBC agents can be a problem. Packed beds of carbon may be employed, but they are less efficient in unpressurized air streams because of their pressure drop and because adsorption is more difficult at lower pressures.

DETAILED DESCRIPTION

As will be explained, the present invention is directed to an environmental control system including a catalytic oxidation reactor that functions to oxidize chemical agents to carbon dioxide ($CO_2$) and water ($H_2O$) and, depending on the particular agent encountered, by-products such as nitrogen oxides ($NO_x$), sulfur dioxide ($SO_2$), and/or hydrogen chloride (HCl). These byproducts can be easily removed with PTFs selectively positioned at different locations within the environmental control system.

Figure 1:
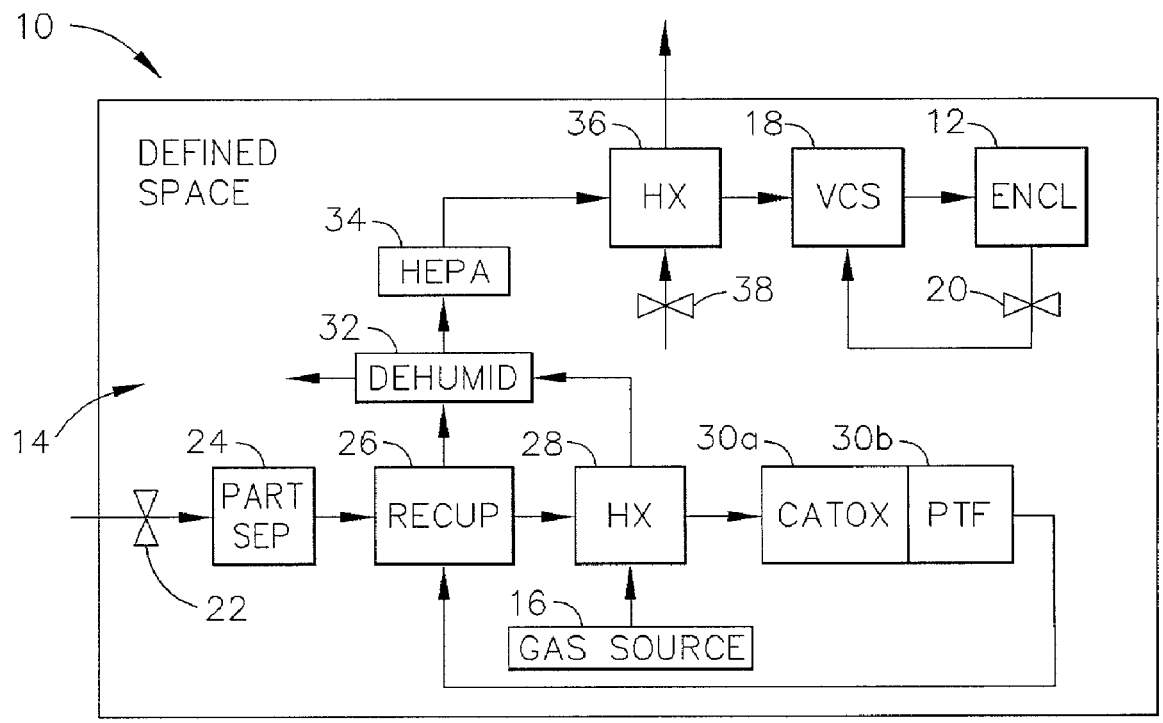
FIG. 1 is an illustration of an environmental control system including a catalytic reactor and a post treatment filter (PTF) located back-to-back.

Referring to FIG. 1, a defined space 10 may take the form of a building, a shelter, a vehicle, or any other space having ambient air. The space 10 includes an enclosed area (e.g., a crew compartment) 12 and an environmental control system (ECS) 14 for providing clean, conditioned air to the enclosed area 12. The defined space 10 may also include a source 16 of heating gas (e.g., a diesel engine).

The ECS 14 may include a vapor cycle system (VCS) 18 for receiving air at ambient or near-ambient pressure, and conditioning the air by adjusting temperature, pressure and humidity to achieve a comfortable environment. A typical VCS 18 includes an evaporator, condensor, refrigerant pump and expansion valve. Air is drawn from the enclosed area 12 by a fan 20 and re-circulated through the VCS 18. Operating at no more than about 1–2 psi above ambient pressure, the VCS 18 conditions the air through its thermodynamic cycle.

The ECS 14 further includes a fresh air circuit for continuously supplying a stream of purified air to the VCS 18. The fresh air circuit includes a fan 22 for drawing air at ambient temperature and pressure into the ECS 14 and providing a motive force for driving a stream of the air through the ECS 14. The incoming ambient air is filtered by a particle separator 24 such as a filter or cyclone usually capable of separating out particles greater than about 20 micrometers in diameter. The filtered air stream is then circulated though the cold side passageways of a recuperator 26 and then through the cold side passageways of an exhaust gas heat exchanger 28. A heating gas (e.g., exhaust from a source 16) is circulated though the hot side passageways of the exhaust gas heat exchanger 28 and exhausted to the ambient. The heating gas raises the temperature of the air stream flowing through the cold side passageways of heat exchanger 28 to a temperature suitable for purification (e.g., 200–500° C.). If a source of heating gas is not available, an electric heater may be used for directly heating the incoming air stream.

The air stream leaving the exhaust gas heat exchanger 28 is treated by an integrated catalytic reactor 30a/PTF 30b. Any chemical agents and TIC/TIMs in the air are oxidized by the chemical reactor 30a. Effluent from the catalytic reactor 30a may include reaction by-products of the catalytic oxidation including acid gases such as hydrogen chloride, sulfur dioxide and nitrogen oxides, as well as inorganic compounds including inorganic TIC/TIMs. These reaction products are removed by the PTF 30b. The air stream leaving the integrated catalytic reactor 30a/PTF 30b is essentially free of chemical agents and reaction products other than water and carbon dioxide. The integrated catalytic reactor 30a/post treatment filter 30b is described in greater detail below.

Biological agents may be killed in the hot passages extending through and between the recuperator 26, the heat exchanger 28 and the catalytic reactor 30a. The conditions in these passages are similar to those employed commercially for sterilization of microbes, typically 200–350° C. and 0.5 sec residence time. The heated passageways through and between the recuperator 26, the heat exchanger 28 and the catalytic reactor 30a have the capability to neutralize biotoxins, viruses, and bacteria, as well as bacteria spores. The benefit of this assembly is that the dependence on consumables such as high efficiency particulate air (HEPA) filters is reduced. In addition, there are no problems of filter overload, breakthrough, bypass, or disposal.

Once the air stream is filtered by the catalytic reactor 30a/PTF 30b, the filtered air is directed through the hot side passageways of the recuperator 26. Heat from the filtered air is expelled through recuperator 26 to the incoming ambient air stream flowing through the cold side passageways, cooling the filtered air before introduction to the VCS 18.

Excess humidity in the filtered air may be removed by a dehumidification device 32 such as a desiccant or an adsorber. Removing the humidity reduces the cooling load that the VCS 18 applies to cool the filtered air to the delivery temperature. The dehumidification device 32 may be regenerated by the heating air leaving the exhaust gas heat exchanger 28.

A high efficiency particulate air (HEPA) filter 34 may be used for removing fine particles, including nuclear particulates, from the filtered and conditioned air leaving the dehumidification device 32. The filtered and conditioned air leaving the HEPA filter 34 is cooled to near ambient temperature by an air-to-air heat exchanger 36 before the air is supplied to the VCS 18. Ambient air is drawn past the heat exchanger 36 by a fan 38 and used as a cooling fluid to cool the air stream.

The catalytic reactor 30*a* and the PTF 30*b* may be totally separate units located adjacent, (i.e., "back-to-back") to one another. The catalytic oxidation and post treatment filtering process can be performed back-to-back because the post treatment filtering can be performed at the same elevated temperature as the catalytic oxidation.

The catalytic reactor 30*a* may operate at residence times of about 0.1 to 1.0 sec and at temperatures in the range of about 200°–450° C. During operation, organic chemical agents, i.e., TICs and TIMs, are oxidized to carbon dioxide and water and heteroatoms such as sulfur, nitrogen, phosphorus, chlorine, and fluorine form acid gases or precursors. The reactions carried out in reactor 30*a* are catalytic, as opposed to stoichiometric. Thus, the catalytic reactor 30*a* differs from the adsorbents currently used in that the threat agents are destroyed, not merely adsorbed or partially reacted. There are at least two advantages to the catalytic reactor 30*a* as compared to using only adsorbents in the filtering systems. Firstly, the useable lifetime of the catalytic reactor 30*a* is much longer than adsorbents. Secondly, the reactor 30*a* need not be disposed of as required of adsorbents containing chemical agents. In addition, inorganic chemical agents and TICs and TIMs are oxidized to varying degrees. Preferably, the catalytic reactor 30*a* may include an oxidation catalyst that operates on air having a temperature in the range of about 200°–500° C. Typically, such a catalyst includes a metal or metal oxide supported on a high-surface area support such as alumina, titania, or silica (titania is preferred). The metal or metal oxide may be a base metal or a precious metal. Catalyst formulations are disclosed in assignee's U.S. Pat. No. 5,292,704 ("Catalyst for destruction of organohalogen compounds"). The preferred formulation includes platinum supported on titania. The preferred formulation may also include up to 5 wt % ceria. The catalyst may be coated onto a metal or ceramic substrate with a geometry that maximizes the mass transfer of reactants to the catalyst with minimum pressure drop.

Other formulations may be incorporated into catalytic reactor 30*a*. See, for example, U.S. Pat. No. 4,238,370; Cao et al., "Thermocatalytic Oxidation of Dimethyl Methylphosphonate on Supported Metal Oxides" Journal of Catalysis, 194, 61–70 (2000); Baier et al., "Catalytic and Thermal Decomposition of Isopropyl Methyl Fluorophosphonate", Industrial and Engineering Chemistry Process Design and Development (Ind. Eng. Chem. Proc. Des. Dev.) 6, 3 (1967) 380–385; Graven et al., "Catalytic Conversion of an Organophosphate Vapor over Platinum-Alumina" Industrial and Engineering Chemistry Process Design and Development (Ind. Eng. Chem. Proc. Des. Dev.) 5, 2 (1966) 183–189.

Figure 2A:
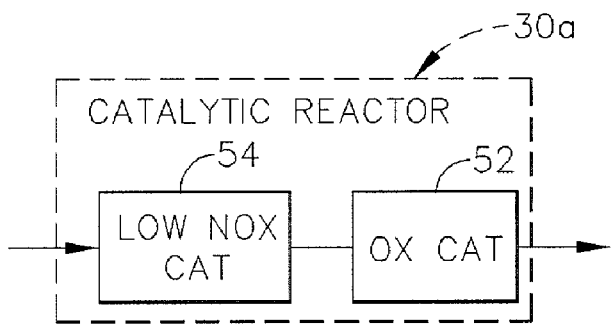
FIGS. 2a, 2b and 2c are illustrations of different catalytic reactors for the environmental control system.
Figure 2B:
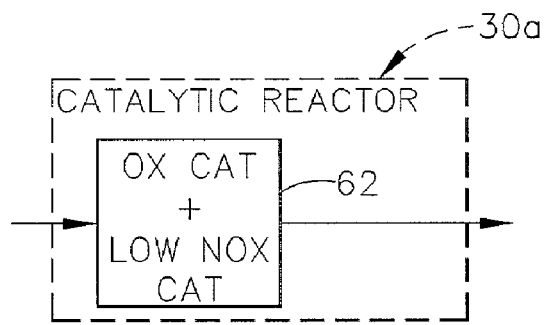
Figure 2C:
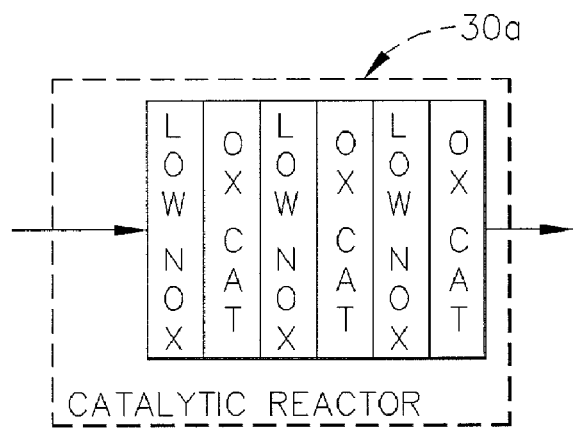

The catalytic reactor 30*a* may also contain a low-$NO_x$ catalyst, which destroys nitrogen-containing compounds with minimum $NO_x$ production. This may result in a reduction of the size and consumption of the PTF 30*b* while increasing the efficiency of the system. Low-NOx catalysts are disclosed in assignee's U.S. Pat. No. 5,292,704 ("Catalyst for destruction of organohalogen compounds"). Other formulations are disclosed in U.S. Pat. No. 5,720,931 ("Catalytic Oxidation of Organic Nitrogen-Containing Compounds"). The two catalysts may be placed in a separate vessels 52 and 54, with the low-NOx catalyst being placed ahead of the other catalyst (see FIG. 2*a*). The two catalysts may be operated at different temperatures. In the alternative, the two catalysts are physically mixed on the same substrate 62 (see FIG. 2*b*) or placed back to back in at least two layers, or (see FIG. 2*c*).

In the embodiment shown in FIG. 1, the PTF 30*b* is positioned adjacent to the catalytic reactor 30*a* and has two functions: oxidizing $NO_x$ to an $NO_2$-rich mixture; and adsorbing the resulting $NO_2$, as well as reactor by-products including HCl and $SO_2$, and inorganic compounds including inorganic TIC/TIMs. The formulation for the PTF 30*b* may be similar to the formulation disclosed in co-pending application Ser. No. 09/823,623 filed on Mar. 31, 2001, assigned to the assignee of the present application and incorporated herein by reference. However, the formulation is not so limited. Other formulations may be used, such as those disclosed by Zensuke Japan Patent Application publication no. 07000743 and Shimada et al. European Patent Application No. 0 625 368 A1. The main requirement is that the PTF 30*b* formulation perform substantially well at the operating temperature of the adjacent catalytic reactor 30*a*.

Figure 3:
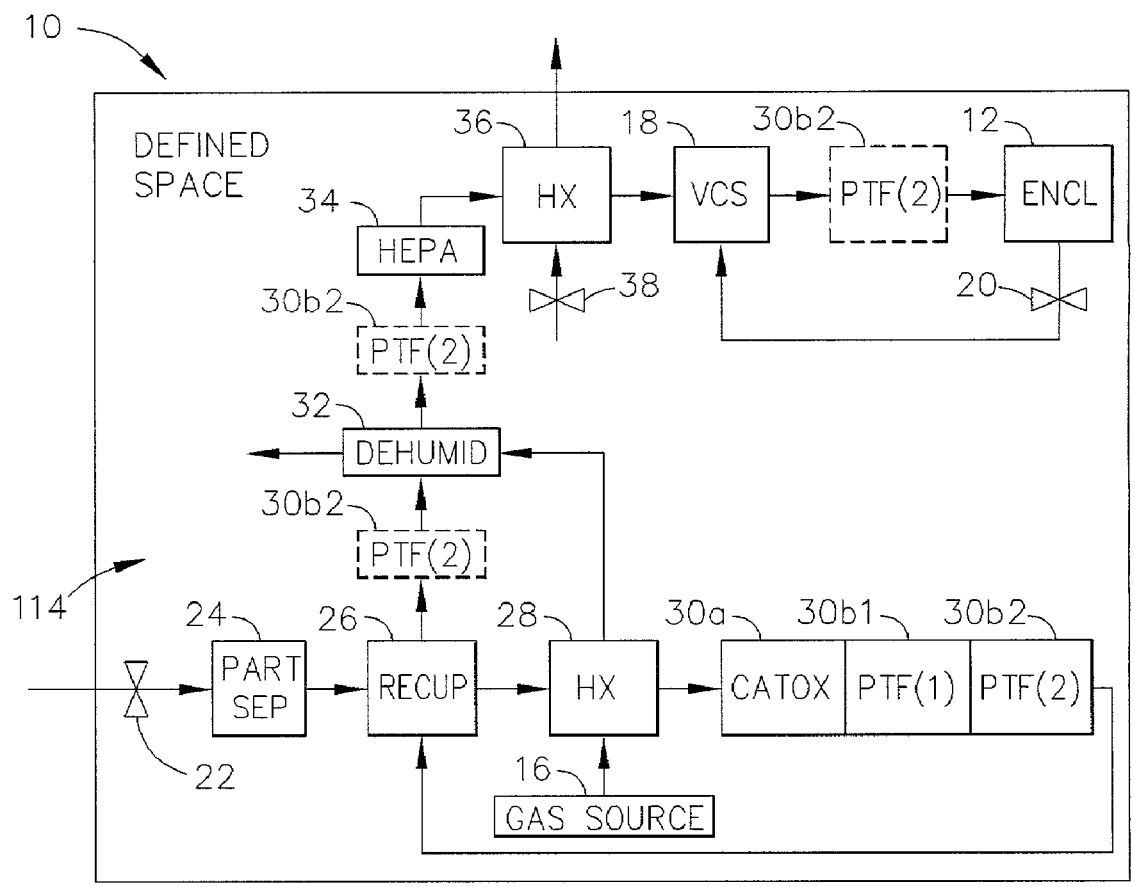
FIG. 3 is an illustration of an environmental control system including a catalytic reactor and a PTF having at least a portion remotely positioned from the catalytic reactor.

Reference is now made to FIG. 3, which shows an alternative ECS 114. The PTF 30*b* may be constructed as two separate filters or layers as shown in FIG. 3, an oxidizing filter 30*b*1 and an adsorbing filter 30*b*2. The oxidizing filter 30*b*1 oxidizes the $NO_x$ to an $NO_2$-rich mixture, and the adsorbing filter 30*b*2 adsorbs the $NO_2$-rich mixture, as well as reactor by-products and inorganic compounds. In this embodiment, the catalytic reactor 30*a* and the oxidizing filter 30*b*1 are integrated into a single assembly.

A standalone support may be used for the catalytic materials of the catalytic reactor 30*a* and the oxidizing filter 30*b*1. However, another component of the ECS 14 may be used instead. For example, the catalysts of the catalytic reactor 30*a* and the oxidizing filter 30*b*1 may be formed on hot passageway surfaces of the exhaust gas heat exchanger 28. The catalysts may be prepared by a conventional method similar to that for preparing ceramic monoliths, except for the following differences. The surfaces of the heat exchanger 28 should be cleaned and preferably treated with heat, strong acid solutions, or strong base solutions to increase the adherence of the catalysts. The catalysts are then applied in at least one coating. When there is only one coating, all necessary catalyst components are added in this coating. When there are multiple coatings, the components can be added as follows. The first coating is designed to have high adherence to the metal surfaces of the heat exchanger 28. Alternatively, the first coating may contain a binder that allows strong adhesion between the coating and the metal surfaces. Further, this first coating may be formed with low porosity and low surface area so that it hinders the diffusion of chloride ions and other materials present in the end-use application that are corrosive to the metal surfaces. One or more subsequent coatings are formed over the first coating to provide high surface areas and high porosity in much the same manner as conventional catalysts. This allows the catalysts to be impregnated into the coating with high dispersion, as well as provide large areas for deposits of phosphorus and other atoms that may be present in the end-use application. Finally, the catalysts are impregnated into the coatings and activated by calcination.

The coatings are designed to maintain the desired pressure drop and heat exchanger efficiency.

The adsorbing filter 30b2 may be located at various points downstream of the integrated reactor 30a/oxidizing filter 30b1. For example, the adsorbing filter 30b2 may be located between the VCS 18 and the enclosed area 12 as shown in phantom in FIG. 3; or between dehumidification device 32 and the air-to-air heat exchanger 36, again as shown in phantom in FIG. 3; or between dehumidification device 32 and the recuperator 26, again as shown in phantom in FIG. 3. The specific construction of this split-layer PTF is described in detail in the co-pending application Ser. No. 09/823,623 filed on Mar. 31, 2001. Regardless of their locations, either or both of the filters 30b1 and 30b2 may be constructed in the form of a bed containing pellets of the material, or the material may be coated on a monolith or another substrate. While the adsorbing filter 30b2 may be located either with the dehumidification device 32 or HEPA filter 34, there are benefits in at least locating the oxidizing filter 30b1 adjacent to catalytic reactor 30a as shown in FIG. 3. One benefit arises because the $NO_x$ oxidation efficiency is greater at the higher temperatures existing at the outlet of catalytic reactor 30a. In addition, the manufacture of the entire system may be simplified as compared to constructing the PTF downstream from reactor 30a.

Figure 4:
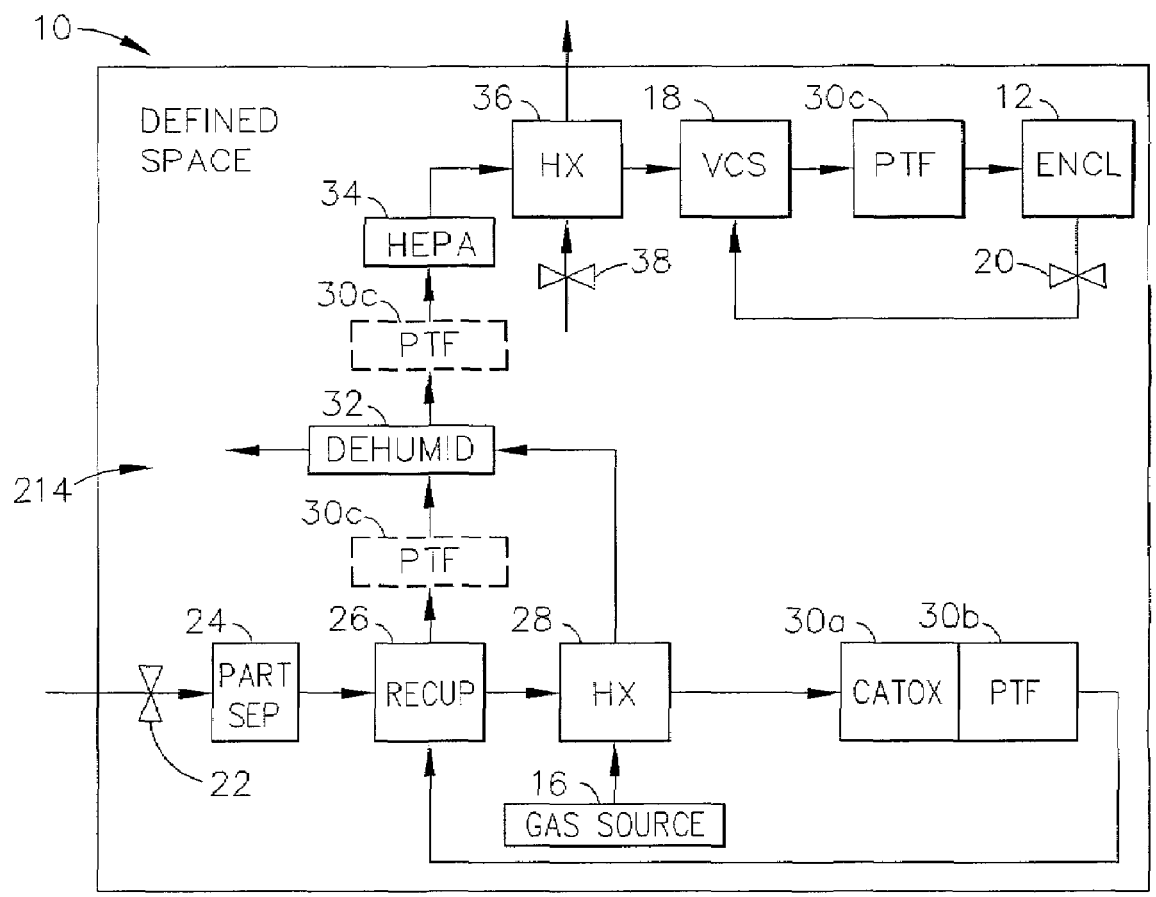
FIG. 4 is an illustration of an environmental control system including separate adsorbing material for adsorbing strong acid gas precursors.

Reference is now made to FIG. 4. To aid in the adsorption of acid gases other than $NO_x$, such as $SO_2$ and HCl, the environmental control system 214 may employ an additional PTF 30c using known adsorbents. The additional PTF 30c may be located downstream from the catalytic reactor 30a for example, back-to-back with the catalytic reactor 30a or between the recuperator 26 and dehumidification device 32 or between the dehumidification device 32 and HEPA filter 34 or even between VCS 18 and enclosed area 12.

Thus disclosed are environmental control systems that can remove biological and chemical agents, TIMs and TICs from un-pressurized, ambient air. Moreover, catalyst oxidation and post treatment filtering may be performed back-to-back. This results in significantly expanded capacity as well as easier integration of the components into a single environmental control system.

The invention is not limited to the specific embodiment described above. Instead, the invention is construed according to the claims that follow.

What is claimed is:

1. An environmental control system for processing an incoming ambient air stream, comprising:
    a catalytic reactor for oxidizing chemicals in the ambient air stream;
    a post treatment filter located downstream from the catalytic reactor and integrated with the catalytic reactor, wherein the post treatment filter comprises a catalyst for oxidizing $NO_x$ to $NO_2$ and an adsorbent for adsorbing $NO_2$; and
    a vapor cycle system for conditioning the air stream.

2. The system of claim 1, further comprising a heater for raising air stream temperature before entering the catalytic reactor.

3. The system of claim 2, wherein the heater includes a heat exchanger using heated exhaust gas to raise the ambient air stream temperature.

4. The system of claim 1, wherein the post treatment filter and the catalytic reactor are isothermal.

5. The system of claim 1, further comprising a recuperator and a dehumidification device between the vapor cycle system and the post treatment filter.

6. The system of claim 1, further comprising a heat exchanger for cooling air entering the vapor cycle system; and a dehumidification device between the heat exchanger and the post treatment filter.

7. The system of claim 1, further comprising an additional post treatment filter downstream from the catalytic reactor for adsorbing acid gases including $SO_2$ and HCl.

8. The system of claim 1, wherein the catalytic reactor includes platinum supported on titania.

9. The system of claim 8, wherein the catalytic reactor further includes up to 5 wt % ceria.

10. The system of claim 1, wherein the catalytic reactor includes an oxidation catalyst and a low-NOx catalyst, the oxidation catalyst and low-NOx catalyst are placed in separate vessels, the low-NOx catalyst upstream of the oxidation catalyst.

11. The system of claim 1, wherein the catalytic reactor includes a substrate, an oxidation catalyst, and a low-NOx catalyst, the oxidation catalyst and low-NOx catalyst being on the substrate.

12. An environmental control system for processing an incoming ambient air stream, comprising:
    a catalytic reactor for oxidizing chemicals in the ambient air stream;
    a heater for raising air stream temperature before the air stream enters the catalytic reactor, wherein the heater is located upstream of the catalytic reactor;
    a post treatment filter located downstream from the catalytic reactor and integrated with the catalytic reactor, wherein the post treatment filter comprises a catalyst for oxidizing $NO_x$ to $NO_2$ and an adsorbent for adsorbing $NO_2$; and
    a vapor cycle system for conditioning the air stream.

13. The system of claim 12 wherein the catalytic reactor comprises an oxidation catalyst wherein the oxidation catalyst can operate in air and at a temperature of from about 200° C. to about 500° C.

14. The system of claim 13 wherein the catalytic reactor further comprises a low-$NO_x$ catalyst.

* * * * *